(12) United States Patent
Park

(10) Patent No.: US 6,959,847 B2
(45) Date of Patent: Nov. 1, 2005

(54) SAW FRAME PROVIDED WITH A ROLL-TIP FOR CUTTING GLASS

(75) Inventor: Dal-Seong Park, Busan (KR)

(73) Assignee: Han-A Tools Co., Ltd. (KR)

( * ) Notice: Subject to any disclaimer, the term of this patent is extended or adjusted under 35 U.S.C. 154(b) by 0 days.

(21) Appl. No.: 10/827,883

(22) Filed: Apr. 20, 2004

(65) Prior Publication Data

US 2004/0194318 A1 Oct. 7, 2004

Related U.S. Application Data

(63) Continuation of application No. PCT/KR02/01984, filed on Oct. 24, 2002.

(51) Int. Cl.[7] .................................................. B26F 3/00
(52) U.S. Cl. ...................... 225/96.5; 30/164.95; 7/158
(58) Field of Search ............................ 416/228, 236 R, 416/237, 62, 240, 23, 41, 44, 131, 132 B; 29/889, 889.2, 889.3, 889.6, 889.7, 889.71; 244/198–200, 201, 203; 30/122, 144, 164.95; 7/158; 83/863, 864; 225/96.5

(56) References Cited

U.S. PATENT DOCUMENTS

| | | | | |
|---|---|---|---|---|
| 881,828 A | * | 3/1908 | Schmidt | 30/144 |
| 1,187,842 A | * | 6/1916 | Kaas | 7/168 |
| 1,342,382 A | * | 6/1920 | Hmirak | 30/144 |
| 1,672,416 A | * | 6/1928 | La Clair | 30/123.3 |
| 1,684,622 A | * | 9/1928 | Harker | 7/154 |
| 2,145,985 A | * | 2/1939 | Krajicek | 30/294 |
| 4,087,914 A | * | 5/1978 | Bates | 30/374 |
| 4,110,907 A | | 9/1978 | Einhorn et al. | |
| 4,245,390 A | * | 1/1981 | Bond | 30/164.95 |
| 4,283,852 A | * | 8/1981 | Hooper | 30/164.95 |
| RE32,986 E | * | 7/1989 | Dettelbach et al. | 83/863 |

FOREIGN PATENT DOCUMENTS

KR         2000-3161         2/2000

* cited by examiner

*Primary Examiner*—Kenneth E. Peterson
(74) *Attorney, Agent, or Firm*—St. Onge Stewald Johnston & Reens LLC

(57) ABSTRACT

Disclosed is a saw frame having wheel cutters for cutting glass. In particular, the present invention relates to a saw frame having wheel cutters respectively mounted to both a saw frame and a handle, and with a plurality of glass bending grooves formed at the bottom of the handle for bending glass cut by the wheel cutters to remove the same. According to the present invention, the saw frame can easily cut out glass as well as wood, metal, plastic or the like.

2 Claims, 3 Drawing Sheets

SAW FRAME PROVIDED WITH A ROLL-TIP FOR CUTTING GLASS

This application is a continuation of pending International Patent Application No. PCT/KR02/01984 filed Oct. 24, 2002 which designates the United States and claims priority of pending Korean Application No. 2001-32916 filed Oct. 27, 2001.

FIELD OF THE INVENTION

The present invention relates to a saw frame having wheel cutters for cutting glass, and more particularly, to a saw frame having wheel cutters respectively mounted to both a main frame and a handle for cutting glass and a plurality of glass bending grooves formed at the bottom of the handle for bending glass cut by the wheel cutters to remove the same.

BACKGROUND OF INVENTION

In general, a saw frame includes a main frame, a handle connected to the main frame and a saw blade interposed between the main frame and the handle in such a manner as to be fitted into them for cutting wood, metal, plastic or the like. However, the conventional saw frame is restricted in uses for cutting just wood, metal, plastic or the like.

DISCLOSURE OF INVENTION

Accordingly, in order to solve the problem involved in the prior art, it is an object of the present invention to provide a saw frame provided with wheel cutters for cutting glass as well as wood, metal, plastic or the like.

To achieve the above object, there is provided an improved saw frame having wheel cutters for cutting glass, which includes a main frame, a handle connected to the main frame and a saw blade fitted into the main frame for cutting various materials, wherein the improvement comprises: guide grooves formed at the front portion of the main frame and the rear portion of the handle; the wheel cutters inserted into the guide grooves in such a manner as to rotatably fitted by fixing pins; and a plurality of glass bending grooves formed at the bottom of the handle for bending the glass cut by the wheel cutters to remove the same.

It is preferred that the glass bending grooves may be formed in different dimensions so as to bend and remove glass of any thickness.

BRIEF DESCRIPTION OF DRAWINGS

Further objects and advantages of the invention will be more fully understood from the following detailed description taken in conjunction with the accompanying drawings in which.

DETAILED DESCRIPTION OF EMBODIMENTS

Figure 1:
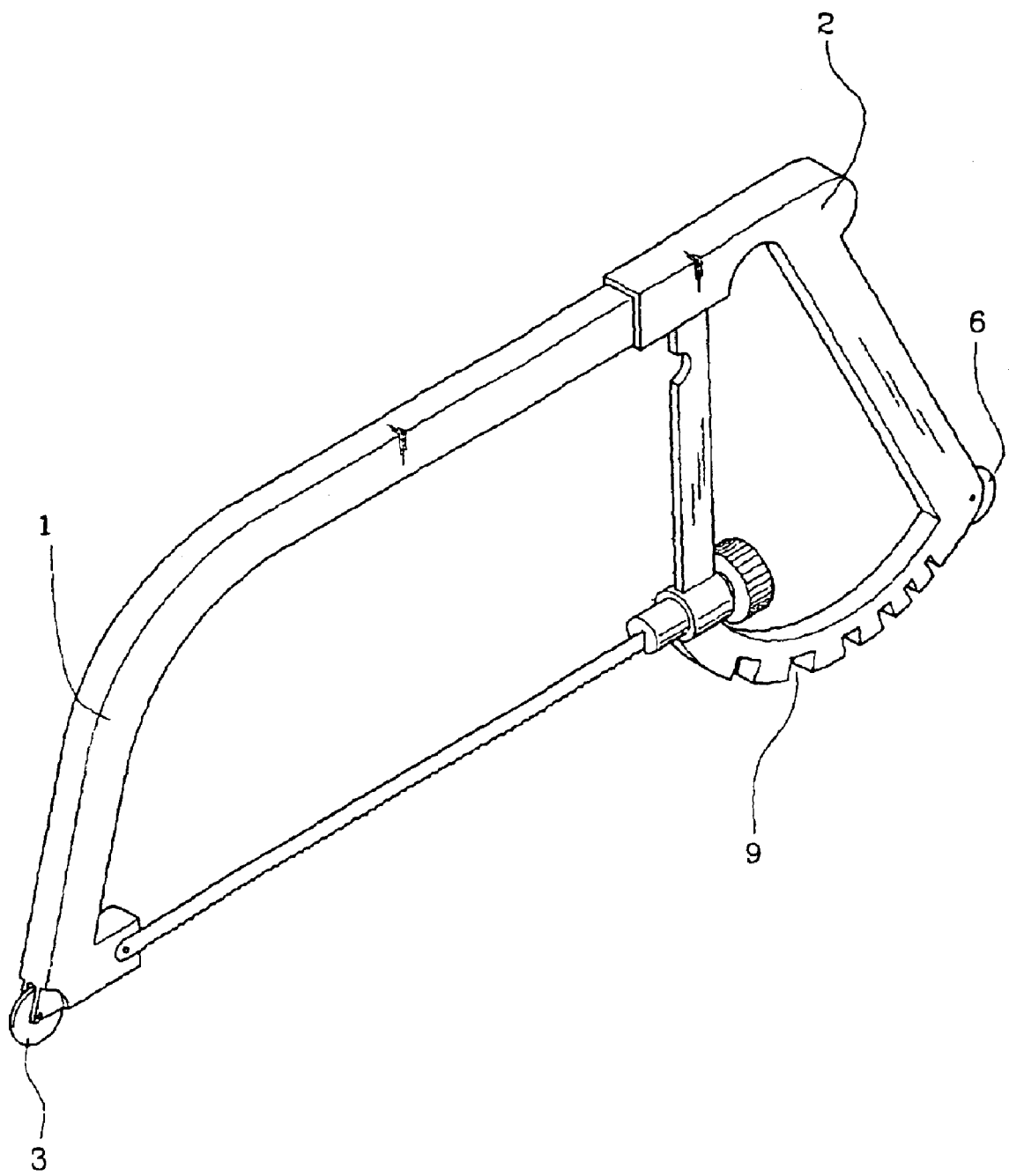
FIG. 1 is a perspective view illustrating a saw frame having wheel cutters for cutting glass according to the present invention.

The present invention will now be described in detail in connection with preferred embodiments with reference to the accompanying drawings. For reference, like reference characters designate corresponding parts throughout several views.

Referring to FIGS. 1 to 5, a conventional saw frame includes a main frame 1, a handle 2 connected to the main frame and a saw blade fitted into the main frame 1 for cutting wood, metal, plastic or the like.

Figure 2:
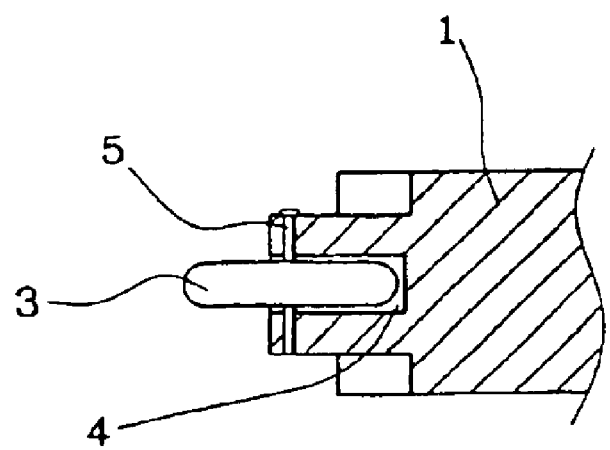
FIG. 2 is a bottom view illustrating one wheel cutter fitted into the front portion of a main frame according to the present invention.
Figure 3:
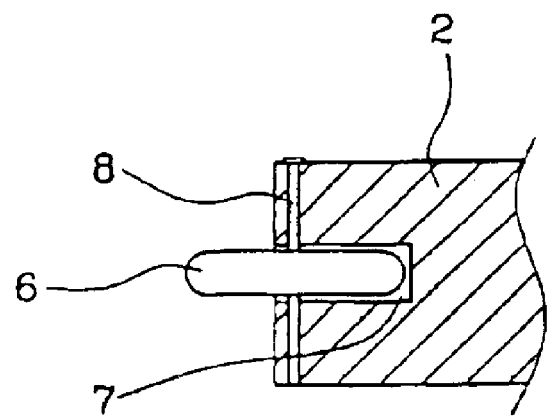
FIG. 3 is a bottom view illustrating the other wheel cutter fitted into the rear portion of a handle according to the present invention.
Figure 4:
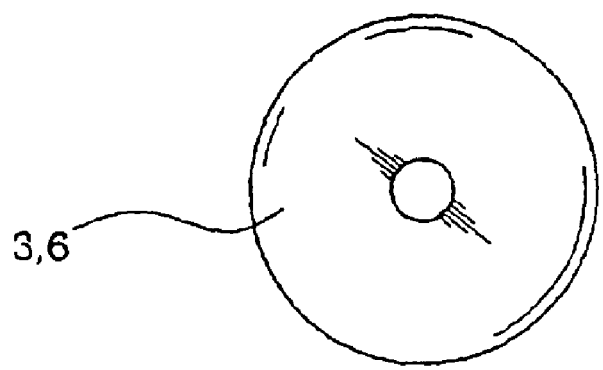
FIG. 4 is a side view illustrating either of the wheel cutters according to the present invention.
Figure 5:
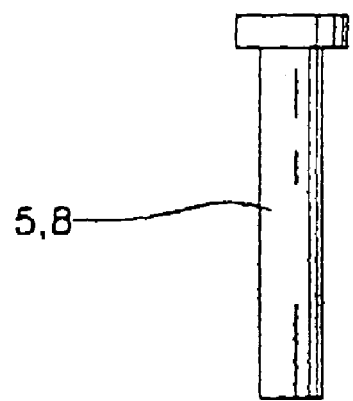
FIG. 5 is a top plan view illustrating a fixing pin according to the present invention.

According to the present invention, guide grooves 4 and 7 are formed at the front portion of the main frame 1 and at the rear portion of the handle 2 as shown in FIGS. 2 and 3, wherein circular wheel cutters 3 and 6 are inserted into the guide grooves 4 and 7 as shown in FIG. 4, rotatably fitted by fixing pins 5 and 8 having a shape as shown in FIG. 5.

Further, a plurality of glass bending grooves 9 are formed at the bottom of the handle 2 for bending the glass cut by the wheel cutters 3 and 6 to remove the same.

Preferably, the respective glass bending grooves 9 are formed in different dimensions so as to freely bend and remove glass of any thickness.

INDUSTRIAL APPLICABILITY

As described above, the present invention can easily cut out glass as well as wood, metal, plastic or the like.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An improved saw frame having wheel cutters for cutting glass, which includes a main frame, a handle connected to the main frame and a saw blade fitted into the main frame for cutting various materials, wherein the improvement comprises:

guide grooves formed at the front portion of the main frame and the rear portion of the handle;

the wheel cutters inserted into the guide grooves in such a manner as to be rotatably fitted by fixing pins; and a plurality of glass bending grooves formed at the bottom of the handle for bending the glass cut by the wheel cutters to remove the same.

2. The saw frame according to claim 1, wherein the plurality of glass bending grooves are formed to have different dimensions so as to bend and remove glass of different thicknesses.

* * * * *